United States Patent [19]
Gordon

[11] Patent Number: 5,822,415
[45] Date of Patent: Oct. 13, 1998

[54] METHOD FOR COUNTING PAY PER USE FEATURE ACTIVATIONS IN CPE

[75] Inventor: Ian R. Gordon, Ottawa, Canada

[73] Assignee: Northern Telecom Limited, Montreal, Canada

[21] Appl. No.: 753,880

[22] Filed: Dec. 2, 1996

[51] Int. Cl.⁶ .......................... H04M 15/00; H04M 3/42; H04M 7/00

[52] U.S. Cl. .............................. 379/140; 379/201; 348/1

[58] Field of Search .................................. 379/111, 112, 379/113, 114, 130, 131, 133, 140, 142, 201; 348/1, 12, 13, 7, 734; 455/5, 4.2, 5.1

[56] References Cited

U.S. PATENT DOCUMENTS

| 4,893,248 | 1/1990 | Pitts et al. | 348/1 |
| 5,438,355 | 8/1995 | Palmer | 348/1 |
| 5,668,591 | 9/1997 | Shintani | 348/734 |

*Primary Examiner*—Paul Loomis

[57] ABSTRACT

Activities in an interactive subscriber telephone terminal including incoming and outgoing calls and including services such as Call Display are counted and stored in a memory in the terminal. The terminal may be queried by a remote server to cause the stored number to be transmitted to the remote server or billing, management or other purposes.

6 Claims, 5 Drawing Sheets

METHOD FOR COUNTING PAY PER USE FEATURE ACTIVATIONS IN CPE

FIELD OF THE INVENTION

This invention relates to telephone subscriber terminals of the type having a display screen and softkeys which are controlled by management software generated by a remote server.

BACKGROUND OF THE INVENTION

In December, 1992 an industry-wide standard protocol for Analog Display Services Interface (ADSI) was completed by Bell Communications Research Inc. (Bellcore specifications) to serve as a standard for voice and display (data) information to be transmitted between subscriber display-based terminals and telecommunications switches or servers over the existing copper telephone lines. This standard protocol also defines the formats for the large scrollable displays and softkeys to support new enhanced, interactive, services.

Typical of the interactive subscriber terminals (telephone sets) designed to support the ADSI protocol is the one described in U.S. patent application Ser. No. 354,599 filed on Dec. 13, 1994 in the name of William V. Pezzullo et al and entitled "Screen-Based Telephone Set For Interactive Enhanced Telephony Service". This copending application is incorporated herein by reference.

The subscriber terminal described in the pending application has a relatively large scrollable display and context-sensitive softkeys which enable the terminal to make full use of services typically provided by telephone operating companies, as well as those services provided by enhanced service providers (ESP) delivering third party services and applications through the PSTN (public switched telephone network).

Enhanced service providers (ESPs) are the second major source of ADSI-based services. ESP applications are driven by information downloaded to the terminal from a server—for example, an interactive voice-responsive system located in a bank.

The terminal supports the ADSI protocol which includes the concept of FDM (feature download management) software scripts which can control the display and the softkeys and cause the terminal to go on-hook, off-hook and dial numbers. The terminal also supports an extension to the Bellcore specifications which allows a server to download an FDM script without any intervention by the subscriber. This capability, called Server Initiated Download or ADSI On-Hook Alerting for Automatic Feature Download, requires access to the Tip and Ring of the telephone line connected to the target subscriber terminal while the terminal is on-hook. The downloading of the FDM script is carried out unobtrusively—i.e., without ringing the telephone.

Billing for the use of features and services obtained via the FDM scripts is currently done by the Central Office Switch of the PSTN which monitors feature accesses and passes this information on to the telephone company billing system.

In some cases it would be useful to allow a service provider that is not associated with the telephone company to bulk purchase features from the telephone company for all their subscribers on a subscription basis and resell those services on a pay per use basis to the subscribers, thereby realizing a new revenue stream. This would require that the service provider have direct access to information relating to the use by each subscriber of the various billable features.

SUMMARY OF THE INVENTION

It is an object of the present invention to provide a mechanism which stores information relating to various feature accesses and which permits communication of this information to a remote service provider.

According to one aspect of the present invention, this is achieved by an interactive subscriber telephone terminal comprising: a telephone keypad containing dial keys; a display screen; a plurality of temporary definable response/data entry keys (softkeys), at least one of the softkeys being programmable by a software script transmitted from a remote server; means for activating a first predetermined telephone feature or service on receipt of a first predetermined software script from a manually depressed respective softkey; means for activating a second predetermined telephone feature or service on receipt of a second predetermined software script transmitted from the remote server; and script counter means for counting and storing the number of times the first and second predetermined software scripts are received thereby providing a count of the number of times the first and second predetermined features or services are activated.

According to another aspect, the present invention provides an interactive subscriber telephone terminal comprising: a telephone keypad containing dial keys; a display screen; a plurality of temporary definable response/data entry keys (softkeys); means for receiving from a remote server and storing software scripts and associated softkey return strings, each softkey return string being a program generated by the manual depression of an associated softkey thereby to activate or deactivate a predetermined telephone feature or service and each software script being a program monitoring the progress of the activation or deactivation of the predetermined feature or service; and counter means responsive to the softkey return strings and the software scripts to count and store the number of times the predetermined feature or service has been successfully activated.

DETAILED DESCRIPTION OF THE PREFERRED EMBODIMENT

Figure 1:
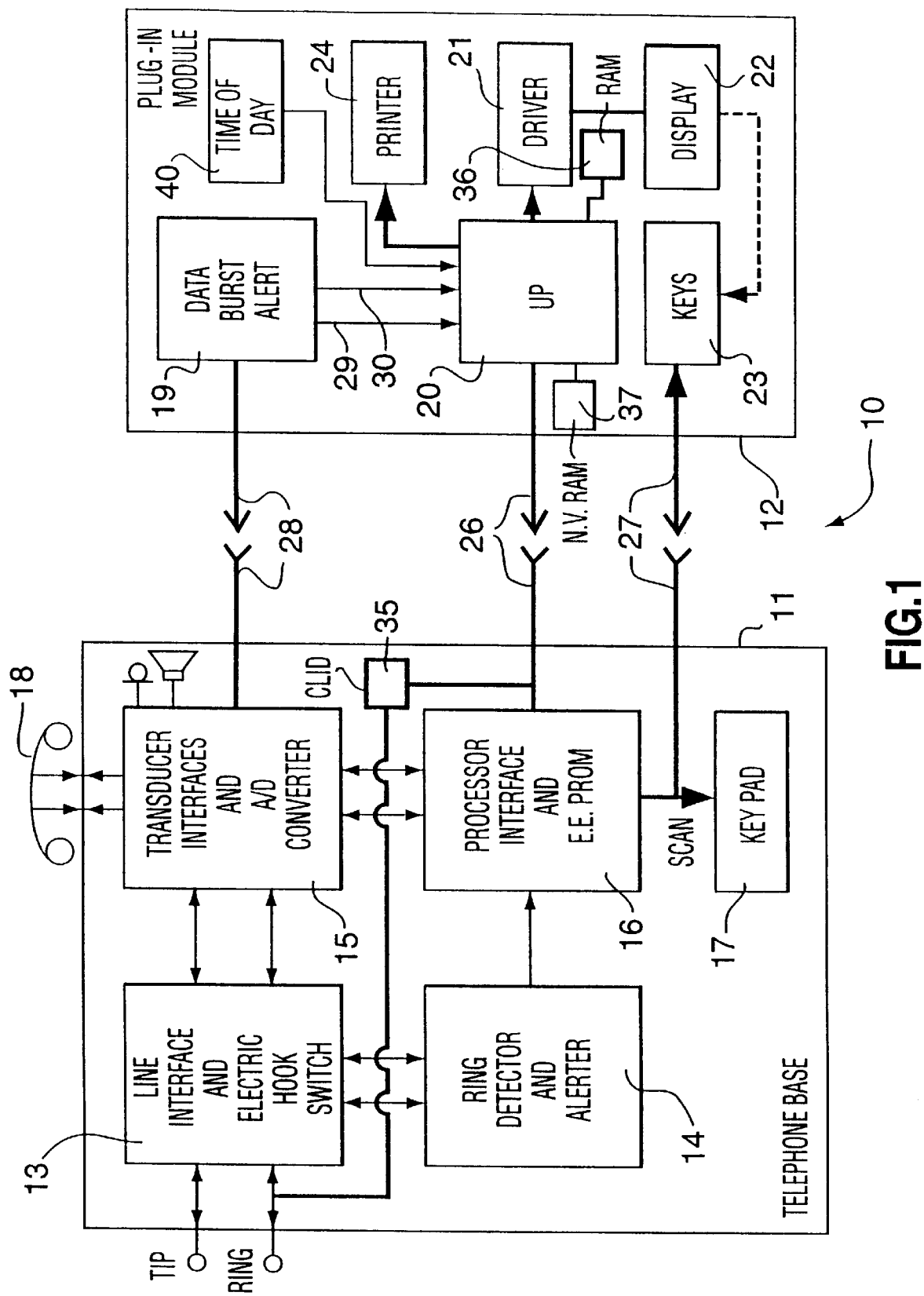
FIG. 1 is a block schematic of an ADSI subscriber terminal according to the present invention.

FIG. 1 of the drawings shows a block schematic of Analog Display Services Interface (ADSI) subscriber terminal 10, which comprises telephone (or terminal) base 11 and plug-in module 12. The base 11 connects to the TIP and RING of the telephone line connecting it to the central office (CO) of the telephone company. The base 11 comprises a line interface and electronic hook switch circuits 13, ring detector and alerter circuits 14, transducer interface and analog-to-digital (A/D) converter circuits 15, processor interface and EEPROM circuits 16, and standard touch-tone telephone keypad 17. A handset 18 is, of course, part of the standard telephone components of the base 11. The ADSI plug-in module 12 comprises a data burst alert circuit 19, a microprocessor 20, an LCD display driver 21, an LCD display 22, softkeys (redefinable keys) 23 adjacent the display 22, and a printer (or printer port for an external printer) 24. Normally, the keys 23 will also include hard-keys such as scrolling cursor keys 25 and so on (as shown in FIG. 2).

Figure 2:
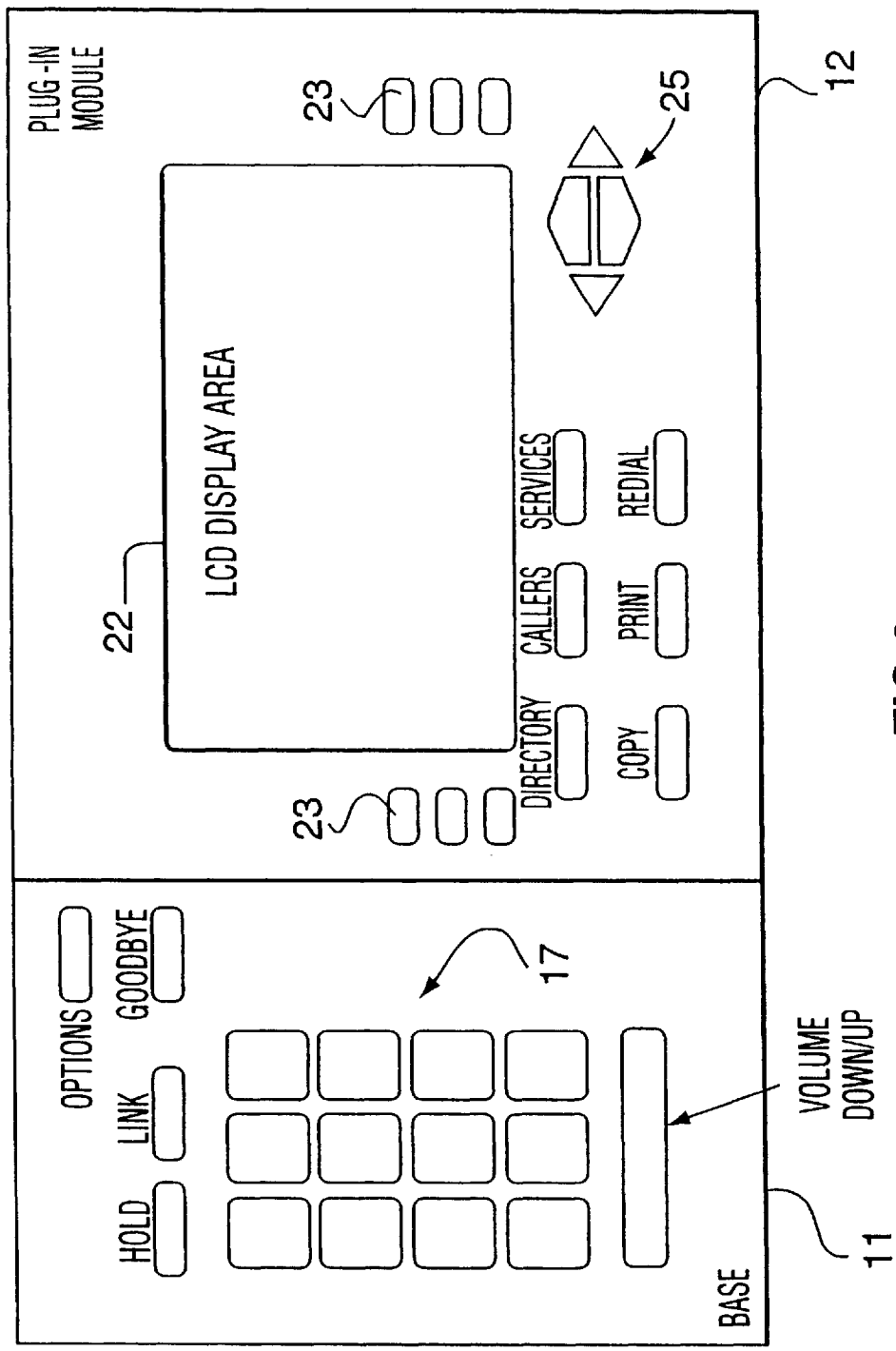
FIG. 2 is a pictorial drawing depicting the front of the subscriber terminal as accessed by a user.

Referring also to FIG. 2, which shows the user-visible front of the ADSI terminal 10, the module 12 plugs into the base 11 and connects to the latter by means of two buses 26 and 27, the former being the processor bus, and the latter for scanning the keys 23. The data burst alert 19, which comprises two switched-capacitor filters for detecting two pre-burst tones, receives signals through the interface 15 via connection 28. The sole function of the alert circuit 19 is to tell the processor 20 by means of high-tone and low-tone leads 29 and 30 that a data burst will follow.

A calling line identifier device (CLID) 35 is also provided in base 11 and a static RAM 36 and a non-volatile random access memory (NVRAM) 37 are provided in module 12 and connected to microprocessor 20. The NVRAM 37 contains a number of counters, one for each FDM service script. Each counter would be required to be at least 2 bytes in length, for a maximum number of feature activations of 65,535 to be maintained by the CPE. For maximum flexibility there would be a large number of these counters. If the counter number were specified by 1 byte this would allow 256 of these counters. This would require 256* 2=512 bytes of non-volatile memory per FDM service script supported by the terminal.

The software running the microprocessor includes instructions to increment, decrement or clear a particular counter in response to a command associated with a particular service or feature and also includes instructions to query a particular counter on receipt of a "query" command.

When a Server Initiated Download is instigated a remote server establishes connection through the PSTN with the subscriber terminal without ringing the telephone. This can be achieved as well known in the art by providing specialized connections from the server to the Central Office Switching equipment. Alternatively as described in a copending U.S. patent application entitled "Interactive Subscriber Telephone Terminal with Automatic Management Software Download Feature", inventor Ian R. Gordon, filed on Nov. 6, 1996, the disclosure of which is incorporated herein by reference, Server Initiated Download can be achieved without the specialized connections. More particularly, according to one aspect, the server calls up the subscriber terminal and when there is a match between the server CLID and a memory in the terminal in which a preselected set of CLIDS is stored, the Server Initiated Download protocol is followed. In another aspect the terminal automatically dials out at predetermined times to preselected servers and in a further aspect a pager in the terminal reacts to a preselected server to cause dial out to the server.

When connection is thus established between the server and the subscriber terminal, ADSI information (such as application and softkey definition data) is transmitted to the terminal at a rate of 1200 baud using the same type of signal that provided the calling line ID. The ADSI information can be transmitted as in-band signalling by previously transmitting two tones, 2130 Hz and 2750 Hz, simultaneously for 80 msecs which the data burst alert 19 recognizes as preceding a burst of ADSI information. Thus, the voice paths are muted during data reception to ensure that data is not corrupted and that the user will not hear data being transmitted. The two frequencies chosen can be isolated from voice because they are not among those generated by the dialpad and also do not occur frequently in conversation.

These ADSI signals pass through the Line Interface and Electronic Hookswitch 13, through the Transducer Interfaces and A/D Converter 15 where they are sampled and converted to digital signals by the A/D, through the Processor Interface and EEPROM 16 which further processes the digital samples and then to the microprocessor 20 which is running S/W code contained in built-in masked ROM. The microprocessor 20 decodes the command and takes appropriate action on the RAM 36 contained within the microprocessor block 20. Information to be sent back to the server originates from the microprocessor 20, is sent to the processor interface and EEPROM 16 and is then converted into DTMF (dual tone multi frequency) digits which are converted to analog waveforms by a D/A converter (not shown) in Processor Interface block 16 which are then applied by the Transducer interfaces to Tip and Ring through the Line Interface and Electronic Hookswitch 13.

The ADSI signals which are sent from the server to the subscriber terminal during Server Initiated Download are FDM script commands and the signals returned from the subscriber terminal to the server are FDM script softkey return string commands. In order to support the present invention the ADSI protocol would have to be extended to provide a new command added to existing FDM script softkey return string commands to cause a specified counter to be incremented, decremented, or cleared and a new command added to existing FDM script commands to cause a specified counter to be incremented, decremented, or cleared.

An FDM script or an FDM script softkey return string may represent a billable feature or service and the associated command will cause the respective script counters in NVRAM 37 to be incremented when the FDM script or FDM script softkey return string is transmitted thereby counting the number of services provided. By way of example, Bell Canada makes available to subscribers a feature known as Busy Call Return either on a pay per use basis or on a subscription basis. This feature allows a subscriber, when he/she calls a number and gets a busy signal, to be notified whenever that number is free so that the call can then be redialled. Typically, this feature is activated by the subscriber hanging up when the busy tone is received, waiting for dial tone and then dialling a specific code, currently *69.

As an alternative on an ADSI telephone set a softkey could be presented by an FDM script on detection of a busy signal such that pressing the softkey could cause the phone to go on-hook, wait 2 seconds, then go off-hook, wait for dial tone and dial the *69. Clearly, the FDM script method is much easier for the consumer to use as only one softkey has to be pressed and the rest follows automatically.

Currently, the telephone company bills for this feature by having software in the central office switch which counts the number of times that the feature is activated by dialling *69. Alternatively, according to the invention, the counting would occur in the terminal. This is particularly well suited to an ADSI terminal which supports an ACMS (Advanced Call Management Services) FDM script, as it can detect call progress tones and automatically put up softkeys to ACTIVATE various telephone company features with a single key press rather than the user having to remember the sequence usually required to activate the feature. The invention encompasses the idea of having the FDM script softkey activate the feature, AND count the number of times the feature was activated in the phone, rather than in the central office switch.

To support this concept, we need to have a command as part of a softkey return string (which is the sequence of commands that are executed whenever a softkey is pressed) which can increment a counter. In the example, the softkey that caused the phone to go on-hook, wait 2 seconds, go off-hook, wait for dial tone, dial *69 would also cause a specific counter to be incremented through the new command.

We may also want to have some way of decrementing a counter if it subsequently turns out that the feature was NOT available at the particular time the subscriber tried to use it—thus the need for a decrement counter command, both as part of a softkey return string AND as part of the generic script body. In the example say the user pressed the softkey to activate the feature, but then got back fast busy (which meant the service was not available). Upon detecting fast busy the counter would be decremented as the person had not really used the service and as such should not be billed for it.

When the server and the subscriber terminal are engaged in an interactive session which is instigated after the subscriber lifts the telephone off-hook, this is known as an SDC (Server Display Control) session. In order to support the present invention the ADSI protocol would have to be extended to provide a new command added to existing SDC commands to allow contents of a specified counter for a specified FDM script to be queried and the value returned to the Billing System via encoded DTMF digits and a new command added to existing SDC commands to allow contents of a specified counter for a specified FDM script to be cleared. These two new SDC commands would have to be supported during Server Initiated Download mode.

Thus, when the server wants to obtain billing information regarding a specified FDM script it sends the "Query" command and after the billing information has been received it sends a "Clear" command to clear the counter.

Specific examples of the new commands are listed below.
FDM Script Softkey Return String Commands
Three new commands are required to support this feature. Suggested examples are given below but the actual codes used would have to be sanctioned by Bellcore.
Increment Counter XX=A1 XX in hexadecimal;
Decrement Counter XX=A2 XX in hexadecimal;
Clear Counter XX=A3 XX in hexadecimal;
where XX is the counter number.

These commands would require the microprocessor to interpret the softkey return string command, and adjust the specified counter in RAM as required.
FDM Script Commands
Three new commands are required to support this feature. Again the examples given are merely suggestions. The actual codes used would be assigned by Bellcore.
Increment Counter XX=0E XX in hexadecimal;
Decrement Counter XX=0F XX in hexadecimal;
Clear Counter XX=10 XX in hexadecimal;
where XX is the counter number.

These commands would require the microprocessor to interpret the script command, and adjust the specified counter in RAM as required.

SDC Query Counter Commands
One new command is required to support this feature:
SDC Parameter Type=Query Counter=153 decimal, 99 hexadecimal, for example or any other appropriate single Byte number assigned by Bellcore so as to uniquely identify this command
Parameter Length=Number of bytes following=0A hexadecimal.
Counter Number=1 Byte=XX
FDM#=4 Bytes=Number of FDM Script for which counter value is to be queried.
Security Code=4 Bytes=Security Code for FDM script for which counter value is to be queried.
Version Number=1 Byte=Version Number of FDM Script for which counter value is to be queried.
If the requested FDM script is not loaded into the subscriber terminal, the terminal will return a DTMF A within 1 second.
If the requested FDM script is loaded into the subscriber terminal, the terminal will return the two byte counter contents LSB first using encoded DTMF followed by a DTMF B within 1 second.
Note that this command needs to be supported during an SDC session, and during a Server Initiated Download so that counter values can be queried without any user intervention.
SDC Clear Counter Commands
One new command is required to support this feature:
SDC Parameter Type=Clear Counter=154 decimal, 9A hexadecimal, for example or any other single byte number assigned by Bellcore so as to uniquely identify the command.
Parameter Length=Number of bytes following=0A hexadecimal.
Counter Number=1 Byte=XX.
FDM#=4 Bytes=Number of FDM Script for which counter value is to be queried.
Security Code=4 Bytes=Security Code for FDM script for which counter value is to be queried.
Version Number=1 Byte=Version Number of FDM Script for which counter value is to be queried.
If the requested FDM script is not loaded into the subscriber terminal, the terminal will return a DTMF A within 1 second.
If the requested FDM script is loaded into the subscriber terminal, the terminal will clear the specified counter to 00 and return a DTMF B within 1 second.
Note that this command needs to be supported during an SDC session and during a Server Initiated Download so that counter values can be queried without any user intervention.

Figure 3:
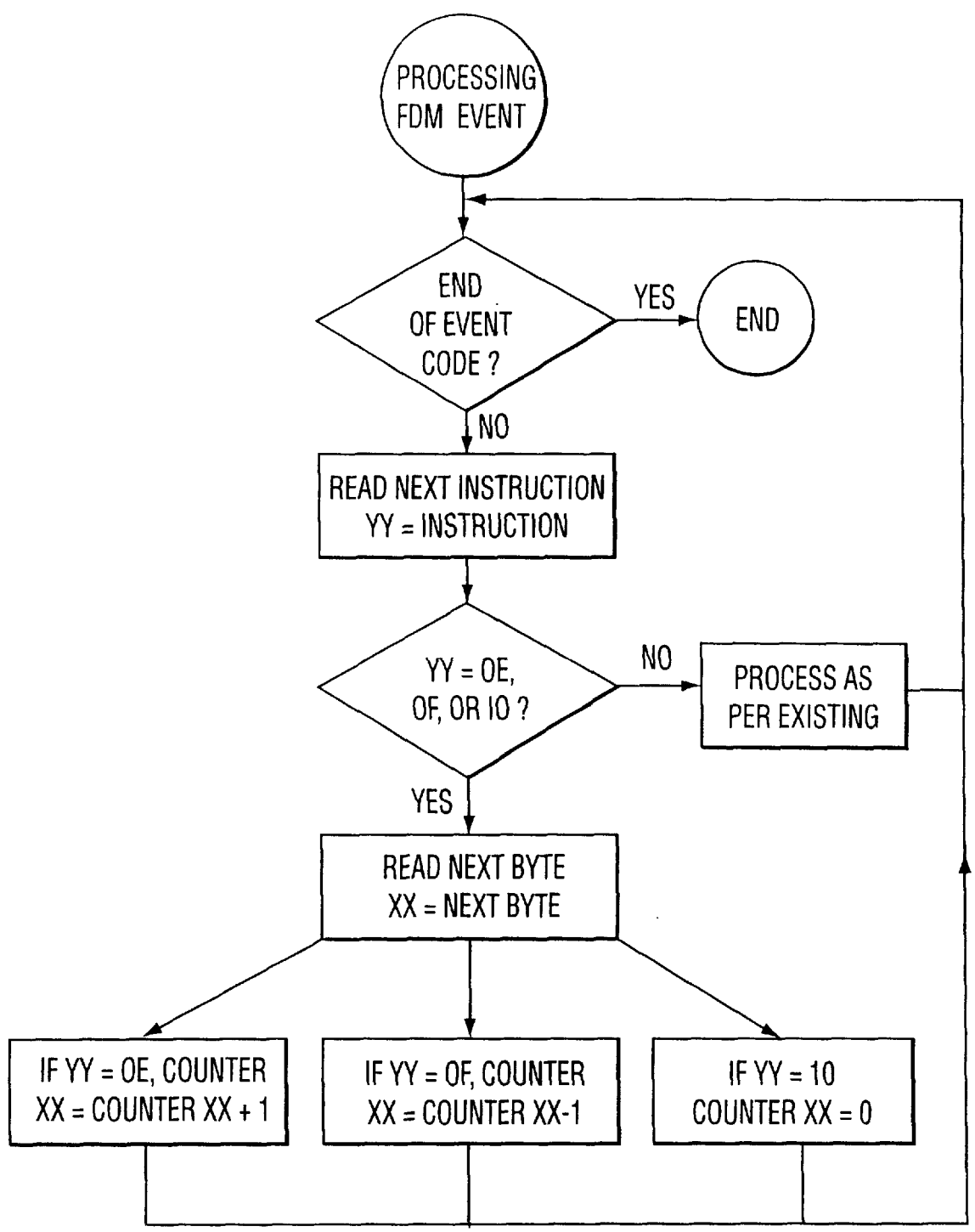
FIGS. 3, 4 and 5 are flowcharts illustrating the process steps carried out by the software for FDM script commands, FDM script softkey return string commands and SDC (Server Display Control) commands, respectively.
Figure 4:
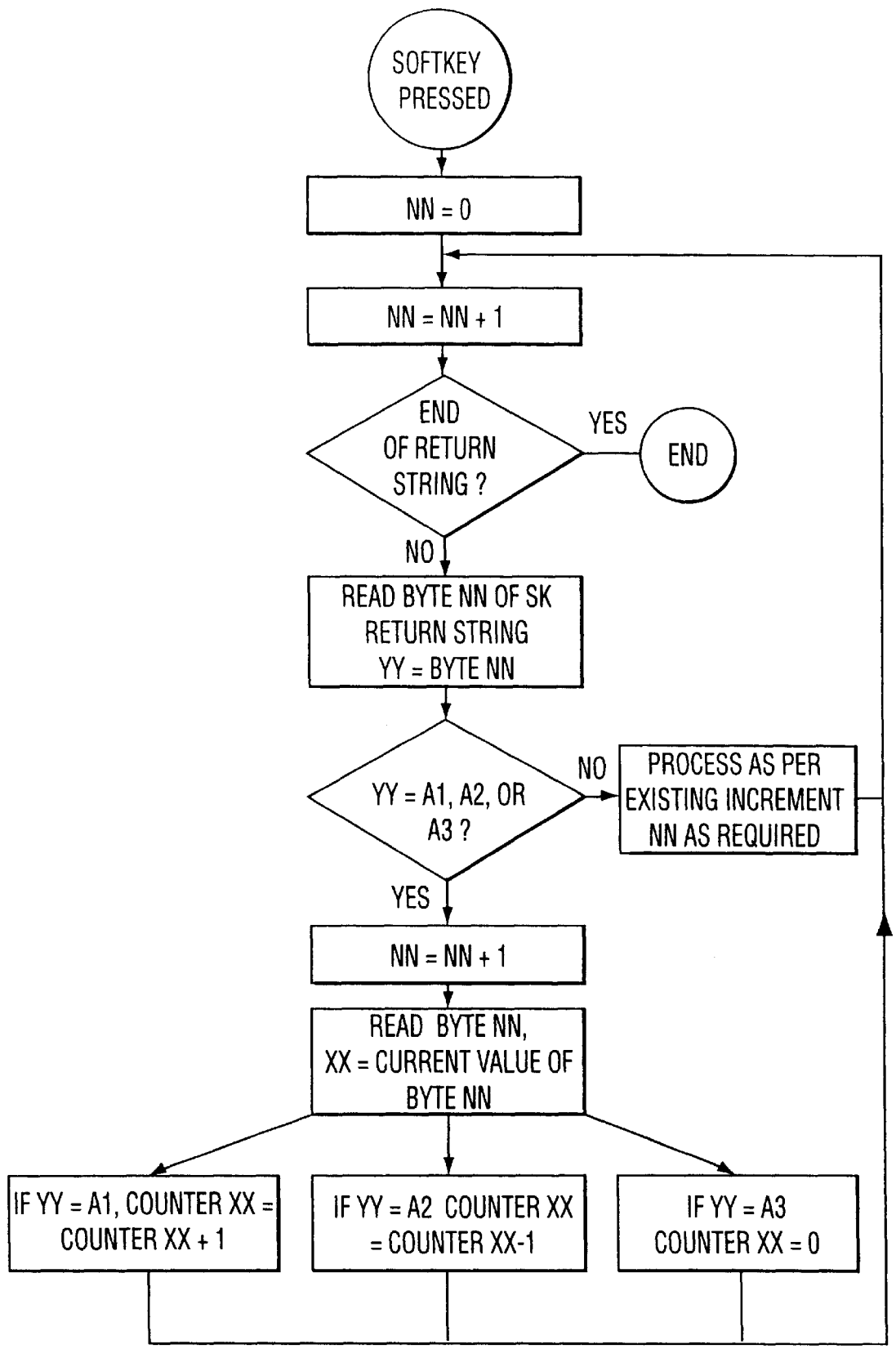
Figure 5:
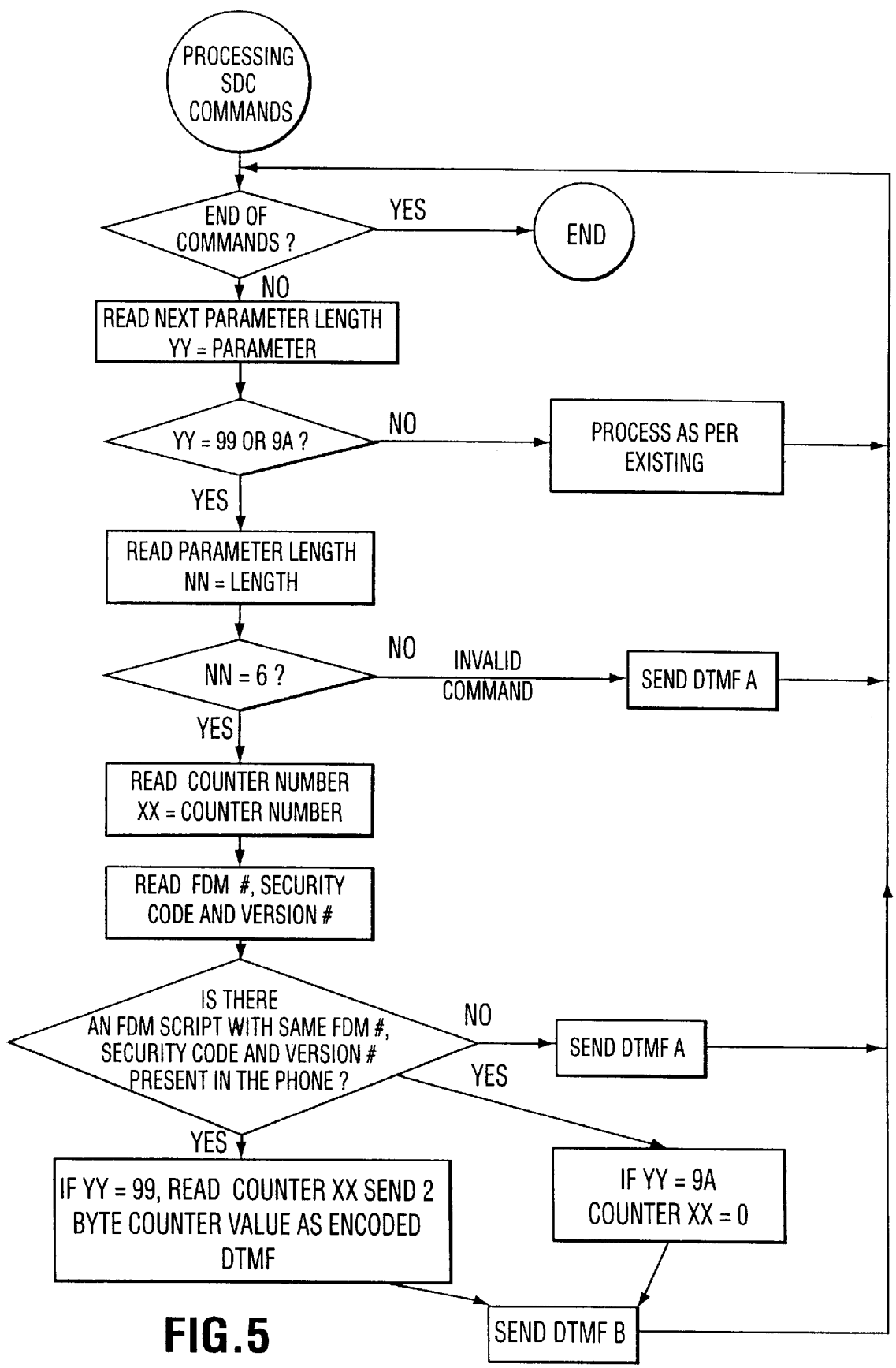

Although the operation of these new commands can be determined from the above description reference is now made to FIGS. 3, 4 and 5 which illustrate more explicitly the software process steps in which these new commands are used. Referring firstly to FIG. 3, which relates to the processing of FDM script commands, as an FDM event is processed the first decision that is made is whether the end of the event code has been reached. If "Yes", the process ends. If "No", the next instruction YY is read and, if this instruction includes 0E, 0F or 10 (increment counter, decrement counter or clear counter) the next byte is read. Thereafter, it is determined which of the three (0E, 0F or 10) is actually present and the counter incremented, decremented or cleared as appropriate.

The process then steps back to the first decision block "End of Event Code?". If none of 0E, 0F or 10 is present in the second decision block "YY=0E, 0F or 10?", then the usual processing steps for the FDM event are followed as indicated by the block "Process as per existing".

The process steps for the FDM softkey return string are illustrated in FIG. 4 and these can be seen to be virtually identical to the process steps shown in FIG. 3. In this case, the inclusion of A1, A2 or A3 in the instruction signifies increment counter, decrement counter and clear counter, respectively.

Turning to FIG. 5, which illustrates the process steps for the SDC commands, the first decision block corresponds to the first decision block of FIGS. 3 and 4 except that it queries "End of Commands" and if "No" the next parameter is read. The next decision block determines if the parameter type is identified by 99 or 9A or by other digits. If 99 or 9A are present (indicating respectively the "Query Counter" and the "Clear Counter" command), the parameter length is read and if this equals 0A hexadecimal the counter number is read. Thereafter the FDM#, security code and the Version# are read and the third decision block determines whether the FDM script specified by the FDM#, security code and the Version# is present in the subscriber telephone. If they are present, the process goes on to read the counter if YY=99 or clear the counter if YY=9A. If the counter is read the counter contents are sent to the remote server. Alternatively, the counter will be cleared (if YY=9A). In both cases a DTMF B is returned to the server to indicate that the command was successful and has been completely processed.

If either NN≠0A hexadecimal or the FDM#, security code or the Version# do not match an FDM script present in the telephone, a DTMF A is returned to the server to indicate to the server that the command was not completed successfully. The process is then looped back to the first decision block to determine whether there are any more commands.

Although in the embodiment described herein the counters are used to provide billing information, the counters could be used in other ways. For example, they could be used simply to provide information about the number of times a particular feature or service was accessed whether or not the feature or service is billable. This information could be used for management or other purposes. Alternatively, the terminal could be arranged when a particular feature or service count exceeds a predetermined value to cause a specific action to be taken. As an example, suppose the counter used to count Busy Call Return activations has exceeded 12 since it was last cleared; this could trigger a screen to be displayed informing the user that they would be billed the maximum for that month, and since they were such a frequent user it would be better for them to be on the subscription method of paying for the service (which results in a more constant revenue stream for the telephone company).

To enable this type of logic would require a new FDM event to be generated whenever a counter changed value—this event would be the trigger that could cause a screen to be displayed. For example, when the user pressed the Call Return Busy softkey for the 12th time, an event would be generated that would contain information that the counter #xx=12. A new command within the script body itself would then trigger on counter #xx being=12, and cause a screen to be shown. Note that the new script body command would also allow different types of comparisons to be made before it would "match"—less than, equal to, greater than, less than or equal to, greater than or equal to. This would provide flexibility to use the counters for almost anything within the script.

I claim:

1. An interactive subscriber telephone terminal comprising:
    a telephone keypad containing dial keys;
    a display screen;
    a plurality of temporary definable response/data entry keys (softkeys), at least one of the softkeys being programmable by a software script transmitted from a remote server;
    means for activating a first predetermined telephone feature or service on receipt of a first predetermined software script from a manually depressed respective softkey;
    means for activating a second predetermined telephone feature or service on receipt of a second predetermined software script transmitted from the remote server; and
    script counter means for counting and storing the number of times the first and second predetermined software scripts are received thereby providing a count of the number of times the first and second predetermined features or services are activated.

2. A terminal according to claim 1, wherein each softkey return string corresponding to activation of a predetermined telephone feature or service has associated therewith a first command causing the counter means to be incremented and each softkey return string corresponding to deactivation of a predetermined telephone feature or service has associated therewith a second command causing the counter means to be decremented.

3. An interactive subscriber telephone terminal comprising:
    a telephone keypad containing dial keys;
    a display screen;
    a plurality of temporary definable response/data entry keys (softkeys);
    means for receiving from a remote server and storing software scripts and associated softkey return strings, each softkey return string being a program generated by the manual depression of an associated softkey thereby to activate or deactivate a predetermined telephone feature or service and each software script being a program monitoring the progress of the activation or deactivation of the predetermined feature or service; and
    counter means responsive to the softkey return strings and the software scripts to count and store the number of times the predetermined feature or service has been successfully activated.

4. A terminal according to claim 3, wherein each software script has associated therewith a third command indicative of a feature or service requested by manual depression of a softkey not being available, the third command causing the counter means to decrement.

5. A terminal according to claim 4, wherein the script counter means is responsive to a query signal from a remote server to transmit the count to the remote server.

6. A terminal according to claim 5, wherein the script counter means is responsive to a clear signal from a remote server to clear the counter.

* * * * *